2,811,223
METHOD OF CONDITIONING AIR

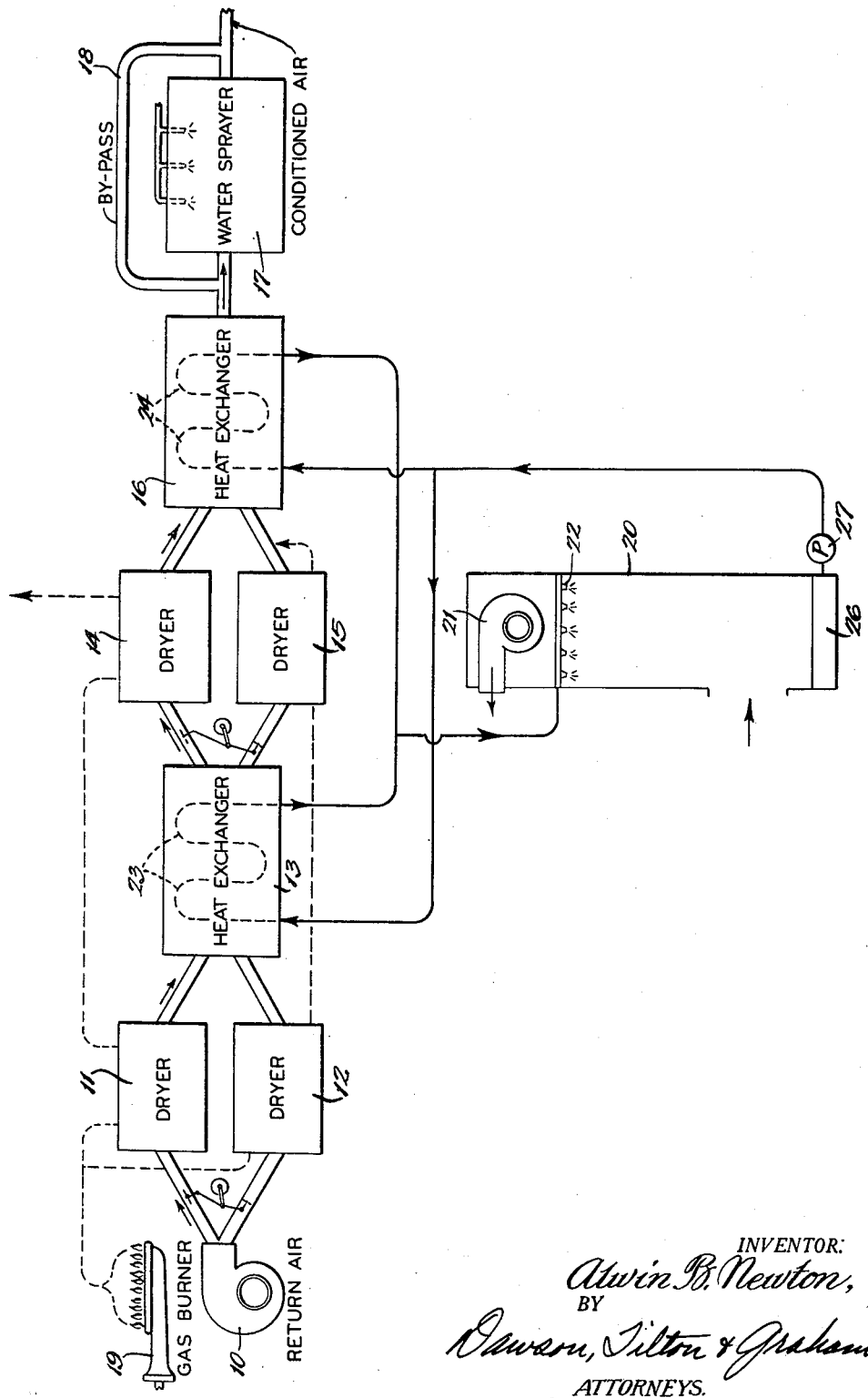

Alwin B. Newton, Wichita, Kans., assignor to The Coleman Company, Inc., Wichita, Kans., a corporation of Kansas Application December 10, 1954, Serial No. 474,551

6 Claims. (Cl. 183—114.2)

This invention relates to a method of conditioning air and more particularly, to a method of conditioning air to any desired latent-sensible temperature. The method of this invention has particular utility for airconditioning houses having gas-fired or oil-fired circulating air heating systems. It also has other uses and applications.

It is a general object of this invention to provide an efficient and economical method of conditioning air adapted for use in conjunction with circulating air heating systems, especially a gas-fired or oil-fired circulating air heating system. A more specific object is to provide a method for adjusting the sensible-latent heat ratio of the conditioning process, and more particularly to provide a method for reducing the sensible temperature and maintaining it at a comfortable level, say 70 to 80° F., while also conditioning the air to a comfortable relative humidity, say 40 to 60% relative humidity. Still another object is to provide a method of the character described which does not require the use of refrigerants or refrigeration, and instead can be operated by using water as the coolant, the temperature of which is controlled by usual outdoor wet bulb temperatures. Still another object is to provide a method of the character described which is adapted for continuous operation on the basis of a repeated cycle, being fully automatic, and requiring no special attention. Further objects and advantages will appear as the specification proceeds.

The method of this invention is diagrammatically illustrated in the attached drawing. This drawing will subsequently be discussed in greater detail.

The present invention is concerned with a method of conditioning air containing water vapor which is characterized by the steps of contacting the air to be conditioned with an adsorbent for water vapor to reduce the water vapor content of the air while increasing its sensible heat content, removing sensible heat from the air, repeating these steps, and then converting liquid water into water vapor by contacting the liquid water with the air to reduce still further the sensible heat content of the air while increasing its content of water vapor. As indicated, the method is carried out in two stages, that is, the drying and heat removal steps are repeated at least twice before the humidification step.

Various adsorbents for water vapor can be used for the dehumidification of the air. Silica gel in granular form, however, is the preferred adsorbent for this purpose. In the first step of the process the air to be conditioned is passed over or through silica gel or other granular adsorbent for water vapor. It will be understood, of course, that the adsorbent material should be employed in a state which favors the adsorption of water vapor, that is, in a relatively dry or unsaturated state. The removal of water vapor from the air by contacting the air with the adsorbent will result in a substantial increase in the sensible heat content of the air, thereby converting the latent heat of the water vapor into sensible heat of the air and adsorbent bed. As a next step, the demoistured air of increased sensible heat content to an indirect heat exchange with water at a lower temperature than the air, to remove sensible heat from the air. This step reduces the total heat content of the air. The demoisturing and sensible heat removal steps are then repeated. Specifically, the air of reduced sensible heat content is again contacted with a silica gel adsorbent or other adsorbent for water vapor to reduce still further the water vapor content of the air while again increasing its sensible heat content, and thereafter the air is subjected to a second indirect heat exchange with water at a lower temperature than the air to remove sensible heat from the air. Further drying and sensible heat removal cycles can be employed if desired without departing from the present invention, although they will usually not be necessary.

The cooled demoisturized air obtained as described above is then preferably subjected to an adiabatic humidification by passing the air or a portion of the air through water sprays until the air or portion thereof is substantially saturated with water vapor, thereby reducing its temperature to the lowest temperature obtainable by adiabatic humidification. In other words, the air is contacted with liquid water to reduce still further its sensible heat content while increasing its content of water vapor. Since it would be undesirable for most airconditioning purposes to employ air which is saturated with water vapor, it will usually be preferable to subject only a portion of the air to adiabatic humidification, and then to mix this portion with the rest of the air, thereby obtaining air at a predetermined moisture content and sensible heat content within the range for human comfort.

An embodiment of the present invention is illustrated somewhat diagrammatically in the accompanying drawing. In this drawing, 10 designates a blower which supplies return air to dryers 11 and 12, which contain the silica gel in granular form. The return air passing over the adsorbent in dryers 11 and 12 gives up part of its moisture content to the adsorbent while increasing the sensible heat content of the air. This is substantially adiabatic drying, although the web bulb temperature does not remain completely constant because some heat of adsorption slightly increases the normal adiabatic change.

The air discharged from dryers 11 and 12 is passed through a heat exchanger 13 where it is subjected to indirect heat exchange with water at a lower temperature than the air, but the water temperature need not be below usual outdoor wet bulb temperatures, which temperatures can readily be obtained at relatively low cost by circulating the cooling water through an outdoor cooling tower. This heat exchange step reduces the total heat of the air while leaving its moisture content unchanged. The air discharged from heat exchanger 13 is passed through a second pair of dryers 14 and 15, which also contain silica gel granules, and for the function of further reducing the moisture content of the air while again increasing its sensible heat content. The heat exchange step is also repeated by passing the air discharged from dryers 14 and 15 through a second heat exchanger 16 constructed like heat exchanger 13. This results in a reduction of the total heat content of the air, and prepares it for adiabatic humidification in water sprayer 17.

Preferably, as illustrated in the drawing, a by-pass 18 is provided around water sprayer 17 for by-passing a selected portion of the air discharged from heat exchanger 16. By controlling the relative proportion of the air diverted through by-pass 18, it is possible to control the final conditioned air to the desired range of temperatures and relative humidities for human comfort. The portion of the air passing through water sprayer 17 is brought into direct contact with the liquid water in the sprays, causing the water to evaporate and increase the moisture content of the air. Preferably, this humidification is carried out in such a way that the air discharged from water sprayer 17 is substantially saturated. The air discharged from water sprayer 17 is then mixed with the by-pass air to provide the conditioned air.

A gas burner 19 is also shown on the drawing. The dotted lines extending from gas burner 19 to dryers 11 and 14 are intended to indicate that heated gases from burner 19 can be employed to regenerate the granular adsorbent contained in the dryers. In this way the adsorbent can be heated and dried, so that it can be reused. With the arrangement illustrated in the drawing, it will be understood that the adsorbent should be periodically regenerated, preferably while no air is being passed through the dryers.

The drawing further shows an air cooling unit 20 provided with a motor-driven blower 21 and spray heads 22 which are connected to the water cooling coils in heat exchangers 13 and 16, indicated respectively at 23 and 24. By way of specific example, unit 20 can be an outdoor water cooling tower. As indicated above, it has been found sufficient to maintain the circulating water in coils 23 and 24 at the normal temperature of outdoor wet bulb air, which can be accomplished in cooling unit 21 by directing outdoor air over spray heads 22 by means of fan 21. In the illustration, the cooled water is collected in sump 26 and returned to heat exchangers 13 and 14 by means of pump 27. Instead of a cooling tower arrangement other sources of cool water can be used, such as a well, lake, etc.

In practicing the method of this invention for airconditioning homes, the return air may have a temperature ranging from 70 to 85° F. and a relative humidity of from 30 to 60%. Under these conditions the process can be carried out employing cooling water in the heat exchangers at any available temperature from 55 to 85° F. Further, by the two drying or dehumidification steps described above, the air can be rendered substantially free of water, and can be given a relative humidity of less than 10%. By way of specific example of the method, the following can be set out:

Return air at 80° dry bulb and 67° wet bulb (50% relative humidity) is contacted with silica gel granules until its dry bulb temperature is increased to 108° and its relative humidity to around 10%. The high sensible heat air is then passed through a heat exchanger having circulating water at 80°, which reduces the dry bulb temperature of the air to 85° with a lower latent heat content of 60° wet bulb (about 22% relative humidity). In the second stage of the drying cycle, the partially demoisturized air is again contacted with silica gel granules until it is substantially free of water, the sensible heat to 108° dry bulb, the relative humidity being about 3%. A second stage heat exchange with water at 80° reduces this high sensible heat air to 85° dry bulb and 53° wet bulb (relative humidity about 5%). This dry air is then divided into two streams, one of which is passed through a water sprayer in which it is adiabatically humidified to the saturation point reaching a dry bulb temperature of about 53°, and the other stream is by-passed around the water sprayer so that the temperature and moisture content of this portion of the air remains substantially unchanged. The cooled saturated air is then mixed with the by-passed air in the proportions desired to produce conditioned air having a dry bulb temperature of 56 to 80° and a relative humidity of from 40 to 60%.

While in the foregoing specification this invention has been described in relation to a specific embodiment thereof and many details have been set forth for purpose of illustration, it will be apparent to those skilled in the art that this invention is susceptible to other embodiments and that many of the details set forth herein can be varied widely without departing from the basic concepts of the invention.

I claim:

1. In the treatment of air for human comfort, the method of conditioning water-vapor containing air characterized by the steps of contacting the air to be conditioned with an adsorbent for water vapor to reduce the water vapor content of the air while increasing its sensible heat content, removing sensible heat from the air, again contacting the air with an adsorbent for water vapor, thereafter again removing sensible heat from the air, then converting liquid water into water vapor by contacting the liquid water with part of the air to reduce still further the sensible heat content of the air while increasing its content of water vapor, and mixing portions of the air of increased water content with portions of the rest of said air.

2. The method of conditioning air containing water vapor, characterized by the steps of contacting the air to be conditioned with an adsorbent for water vapor to reduce the water vapor content of the air while increasing its sensible heat content, removing sensible heat from the air, again contacting the air with an adsorbent for water vapor, thereafter again removing sensible heat from the air, then humidifying only a portion of the air by contacting it with liquid water to reduce still further the sensible heat content of this portion of the air while increasing its content of water vapor, and then mixing said portion of the air with the remaining unhumidified portion of the air to produce air, conditioned to a predetermined moisture content and sensible heat content.

3. The method of conditioning air for human comfort, comprising passing air containing vapor adsorbing condition to reduce the water vapor content of the air while increasing its sensible heat content, removing sensible heat from the air by subjecting said air to an indirect heat exchange with water at a lower temperature than said air, again passing said air over granular silica gel in a water vapor adsorbing condition to still further reduce the water vapor content of the air and at the same time increase its sensible heat content, then again removing sensible heat from the air by subjecting it to an indirect heat exchange with water at a lower temperature than the air, then passing only a portion of the air through water sprays to reduce still further the sensible heat content of the air while increasing its content of water vapor, and then mixing said portion of increased water content with the rest of the air from said second-mentioned sensible heat removal step.

4. The method of conditioning air for human comfort, comprising bringing air at a dry bulb temperature of from 70 to 85° F. and at a relative humidity of from 30 to 60% into contact with granular silica gel in a water vapor adsorbing condition to reduce the water vapor content of the air while increasing its dry bulb temperature to above 90° F., next subjecting said air to an indirect heat exchange with water having a temperature of from 55 to 85° F. to reduce the dry bulb temperature of the air, again passing said air over granular silica gel in a water vapor adsorbing condition to still further reduce the water vapor content of the air and at the same time increase its sensible heat content, then again subjecting said air to an indirect heat exchange with water having a temperature of from 55 to 85° F. to reduce the dry bulb temperature of the air, finally subjecting only a portion of the air to an adiabatic humidification stage until said air portion is substantially saturated with water vapor and has its dry bulb temperature reduced still further, while by-passing the rest of said air around said humidification stage, and then mixing portions of said humidified and by-passed air with each other.

5. The method of conditioning air for human comfort, comprising contacting air containing water vapor with an adsorbent for water vapor to reduce the water vapor content of the air while increasing its sensible heat content, removing sensible heat from the air by subjecting said air to an indirect heat exchange with water maintained at approximately the outdoor wet bulb air temperature, again contacting the air with an adsorbent for water vapor, thereafter again removing sensible heat from the air by subjecting said air to an indirect heat exchange with water maintained at approximately the outdoor wet bulb air temperature, then passing only a portion of the air through water sprays to reduce still further the sensible heat content of the air while increasing its content of water vapor, while by-passing the rest of said air around said water sprays, and then mixing portions of said by-passed air portions of said air of increased water content.

6. In the treatment of air for human comfort, the method of conditioning water-vapor containing air, comprising passing the air to be conditioned over granular silica gel in a water vapor adsorbing condition to reduce the water vapor content of the air while increasing its sensible heat content, removing sensible heat from the air by subjecting said air to an indirect heat exchange with water at a lower temperature than said air, said water being maintained at said lower temperature by the continuous circulation of said water through a temperature reducing unit in which said water is brought into a heat exchange relation with the outdoor air, again passing said air over granular silica gel in a water vapor adsorbing condition to further reduce the water vapor content of the air and at the same time increase its sensible heat content, then again removing sensible heat from the air by subjecting it to an indirect heat exchange with water maintained at a lower temperature than the air, said water being maintained at said lower temperature by continuously circulating it in the same manner as previously specified for the first-mentioned cooling water, then passing only a portion of the air through water sprays to reduce still further the sensible heat content of the air while increasing its content of water vapor and finally remixing said air portion of increased water content with air directly from said second-mentioned sensible heat removal step.

References Cited in the file of this patent

UNITED STATES PATENTS

| | | |
|---|---|---|
| 1,749,763 | Fleisher | Mar. 11, 1930 |
| 1,762,762 | Coffey | June 10, 1930 |
| 1,872,783 | Miller | Aug. 23, 1932 |